United States Patent
Bier et al.

(10) Patent No.: US 12,541,934 B2
(45) Date of Patent: Feb. 3, 2026

(54) SYSTEM AND METHOD FOR RAPID SENSOR COMMISSIONING

(71) Applicant: Genesee Valley Innovations, LLC, Santa Clara, CA (US)

(72) Inventors: Eric A. Bier, Palo Alto, CA (US); Alejandro E. Brito, Mountain View, CA (US); Saman Mostafavi, San Francisco, CA (US); Lester D. Nelson, Santa Clara, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 85 days.

(21) Appl. No.: 18/459,167

(22) Filed: Aug. 31, 2023

(65) Prior Publication Data

US 2025/0078430 A1    Mar. 6, 2025

(51) Int. Cl.
   *G06T 19/20*   (2011.01)
   *G01D 21/02*   (2006.01)
   *H04L 67/12*   (2022.01)

(52) U.S. Cl.
   CPC ............ *G06T 19/20* (2013.01); *G01D 21/02* (2013.01); *H04L 67/12* (2013.01)

(58) Field of Classification Search
   CPC .......... G06T 19/20; G01D 21/02; H04L 67/12
   See application file for complete search history.

(56) References Cited

U.S. PATENT DOCUMENTS

| | | | |
|---|---|---|---|
| 2016/0294829 A1* | 10/2016 | Angus | H04L 63/18 |
| 2020/0175766 A1* | 6/2020 | Gawrys | G06F 16/9027 |
| 2022/0299338 A1* | 9/2022 | Mathur | G01C 21/005 |
| 2024/0354832 A1* | 10/2024 | Reuter | G06Q 30/0639 |
| 2025/0085114 A1* | 3/2025 | Suzuki | G01S 17/931 |

\* cited by examiner

*Primary Examiner* — Daniel F Hajnik
*Assistant Examiner* — Jed-Justin Imperial
(74) *Attorney, Agent, or Firm* — Krista A. Wittman

(57) ABSTRACT

A system and method for rapid sensor commissioning is provided. A three dimensional model of a space is generated. The space is scanned for identifiers associated with wireless sensors placed within the space. At least one of the identifiers associated with the wireless sensors is identified. The model is annotated with a representation of the sensor identified by the identifier, and data is collected from the wireless sensor.

20 Claims, 8 Drawing Sheets

SYSTEM AND METHOD FOR RAPID SENSOR COMMISSIONING

FIELD

This application relates in general to sensors and in particular, to a system and method for rapid sensor commissioning.

BACKGROUND

The use of sensors is becoming extremely popular across a large number of industries and uses. In general, sensors detect events or changes occurring within an environment. Commonly used sensors include temperature sensors, proximity sensors, infrared sensors, pressure sensors, light sensors, and ultrasonic sensors, as well as smoke, gas or alcohol sensors. Such sensors are being utilized to help automate the detection of events and address the detected events. For example, temperature sensors or smart thermostats can be used within a building to determine how temperature changes from space to space or within a single space. Results of the temperature changes can then be used to adjust a temperature of the building.

At this time, limited numbers of sensors are used, such as centralized thermostats. Those sensors are placed and tracked manually. However, as the use of sensors increases, such as by placing a thermostat in every office or cubicle of an office building, commissioning the sensors and placing the sensors within a particular space can be time consuming and complex. Additionally, later identifying those sensors or recalling the locations of the sensors can be challenging due to the large number of sensors in a large space.

Accordingly, placing and identifying large amounts of sensors in a space in a short amount of time, to later collect data from those sensors, is needed. Preferably, representations of the sensors are placed in a model of the space to ensure all sensors have been identified. Once identified, data from the sensors is collected for display, processing, and analysis.

SUMMARY

Commissioning a large number of wireless sensors in a short amount of time is advantageous. During sensor commissioning, the wireless sensors are placed in a space and are connected to a wireless hub. A model is generated for the space and can include a 3D model or a floor plan. The model is annotated to show three-dimensional positions of the wireless sensors in the space. Data associated with each of the wireless sensors can also be used to annotate the model. After all the wireless sensors are identified and included in the model, data is then collected from each of the wireless sensors. The data is then displayed or analyzed to provide information about the space.

An embodiment provides a system and method for rapid sensor commissioning. A three dimensional model of a space is generated. The space is scanned for identifiers associated with wireless sensors placed within the space. At least one of the identifiers associated with the wireless sensors is identified. The model is annotated with a representation of the sensor identified by the identifier, and data is collected from the wireless sensor.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Sensors are commonly used in many different industries to obtain data about an environment in which the sensors are placed. For example, more and more buildings and dwellings are installing "smart" thermostats that utilize temperature sensors in different areas of the building or dwelling to adjust the heating or cooling as necessary. With the increase in the use of sensors, especially in large spaces, tracking the sensors, organizing the data from the sensors, and maintaining the sensors becomes complex and requires more time. However, the ability to rapidly commission sensors, including marking and mapping the sensors, allows any placed sensors to be identified and monitored in a short amount of time to measure and verify dynamics of a space.

Figure 1:
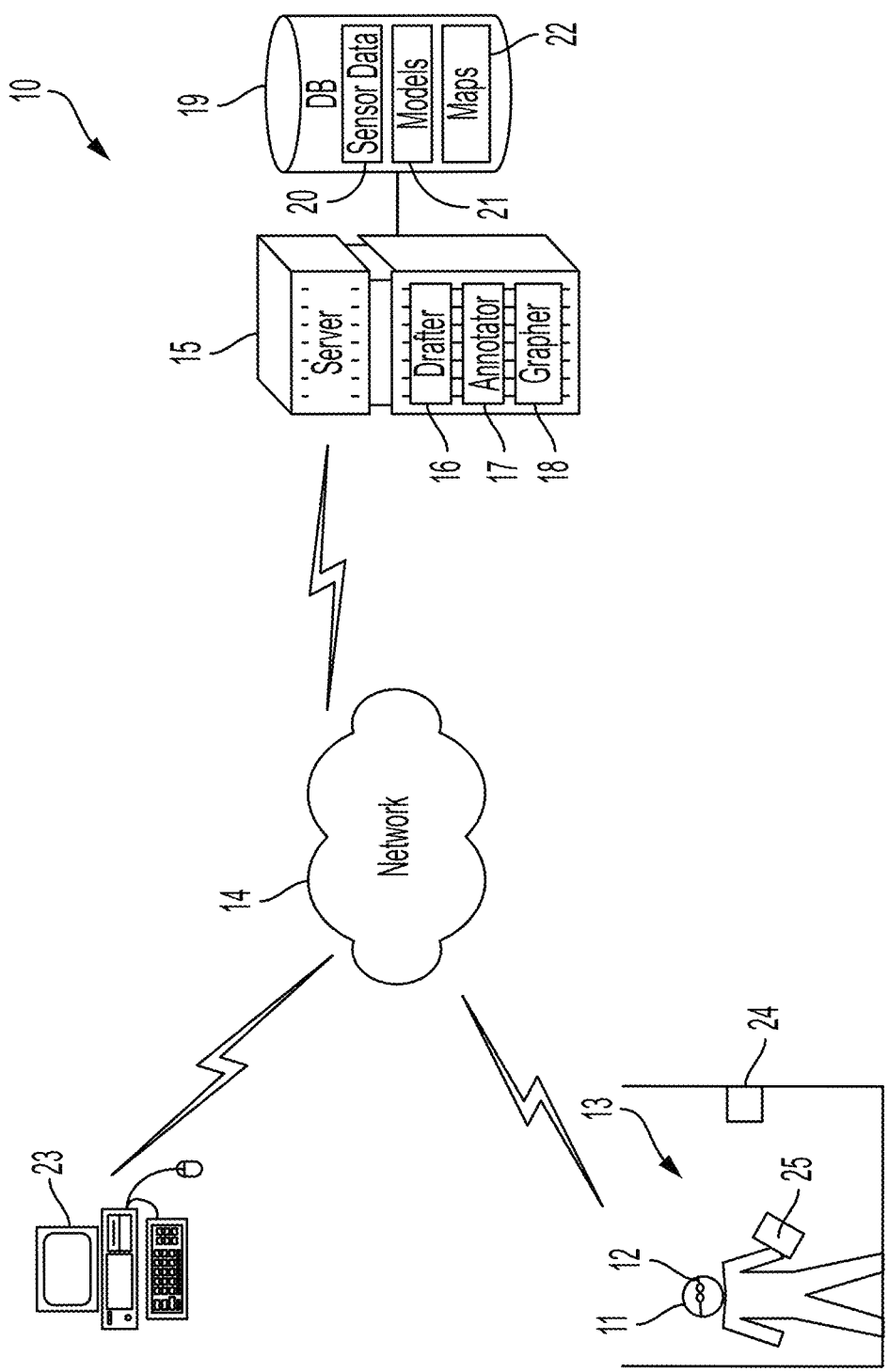
FIG. 1 is a block diagram showing a system for rapid sensor commissioning in accordance with one embodiment.

Commissioning many wireless sensors in a short amount of time is advantageous for applications in different fields, such as building commissioning, energy management, predictive maintenance, factory design, datacenter energy reduction, and many other applications. FIG. 1 is a block diagram showing a system 10 for rapid sensor commissioning in accordance with one embodiment. A user 11 puts on an augmented reality headset 12, such as a Microsoft HoloLens 2, to obtain triangle mesh data for a space 13 for which a floorplan is to be generated. The mesh data can approximate walls, floors, ceilings, furniture and other features of a space, such as a building interior.

The mesh data is transmitted to a server 15 via an internetwork 14. The server is interfaced with a database 19 and includes a processor to execute modules, including a drafter 16, annotator 17, and grapher 18. The drafter 16 receives the mesh data and performs geometric processed to produce a three-dimensional model or floor plan 21 from the mesh data. The floor plans 21 are stored in the database 19.

Generating the model or floor plan using mesh data is further described in detail in U.S. patent application Ser. No. 18/297,506, to Bier et al., which is hereby incorporated by reference in its entirety. Additional methods for generating the model or floor plan are possible, including using cameras, LiDAR, and other means.

Sensors 24 located in the space 13 are identified by the user 11 using, for example, a QR code recognition application running on a mobile device 25 or HoloLens 12 operated by the user 11. Prior to or after placement in the space, QR codes can be generated for each sensor and stored as sensor data 20 in the database 19. In one example, the QR code that encodes the MAC address of the corresponding sensor. The QR codes are attached to the sensors for later recognition.

Once the sensors 24 are identified, the annotator 17 annotates the model or floor plan with the sensors by correlating a position and orientation of the sensors with the coordinates of the model or floor plan. Data from the sensors can also be captured for processing. The grapher 18 aggregates the captured data to produce a dynamic heat map 22 of the space 13, based on the type of data being measured by the sensors, for output or display to the user, such as via a computing device 23 over the Internetwork 14. The computing device 23 can include a desktop computer or mobile computing device, such as a cellular phone, laptop, tablet, or other types of mobile computing devices. Heat maps are further described in detail below with respect to FIGS. 10A and 10B.

Figure 2:
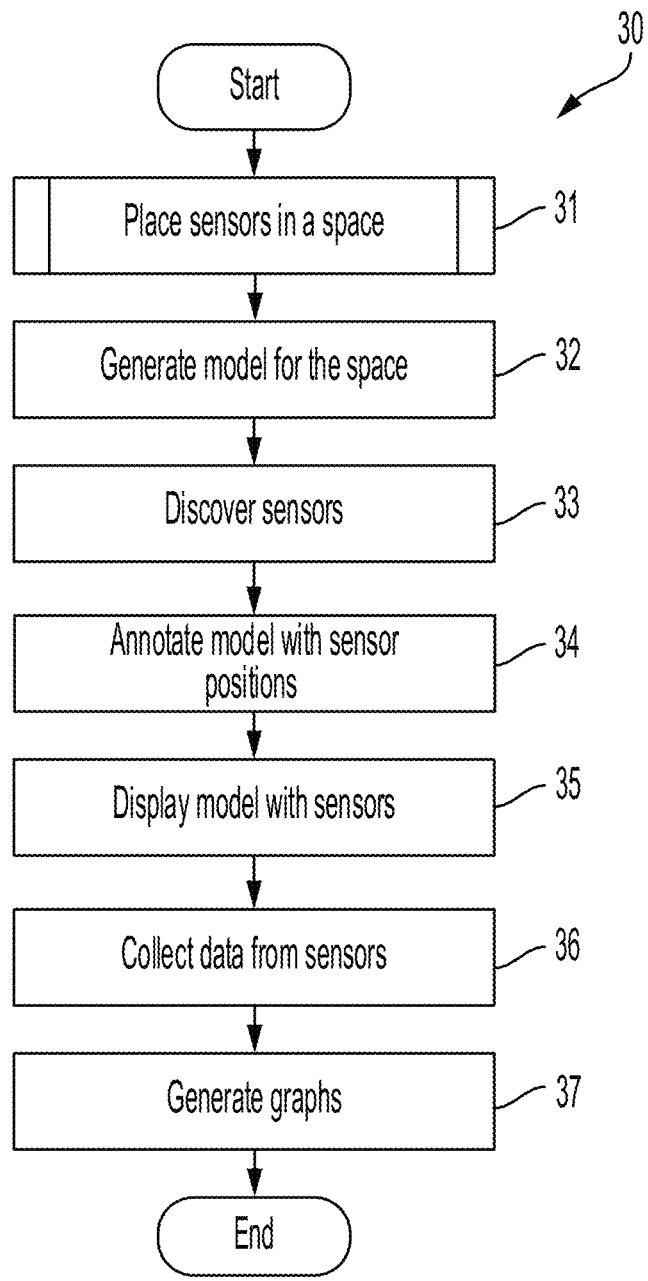
FIG. 2 is a flow diagram showing a method for rapid sensor commissioning in accordance with one embodiment.

Rapid sensor commissioning assists users discovering positions and orientations of wireless sensors in three-dimensional spaces. FIG. 2 is a flow diagram showing a method 30 for rapid sensor commissioning, in accordance with one embodiment. Wireless sensors are associated with a QR code or other identifier and placed (step 31) within a space. Generating the QR code and placement of the sensors are further described below with respect to FIG. 7.

Figure 3:
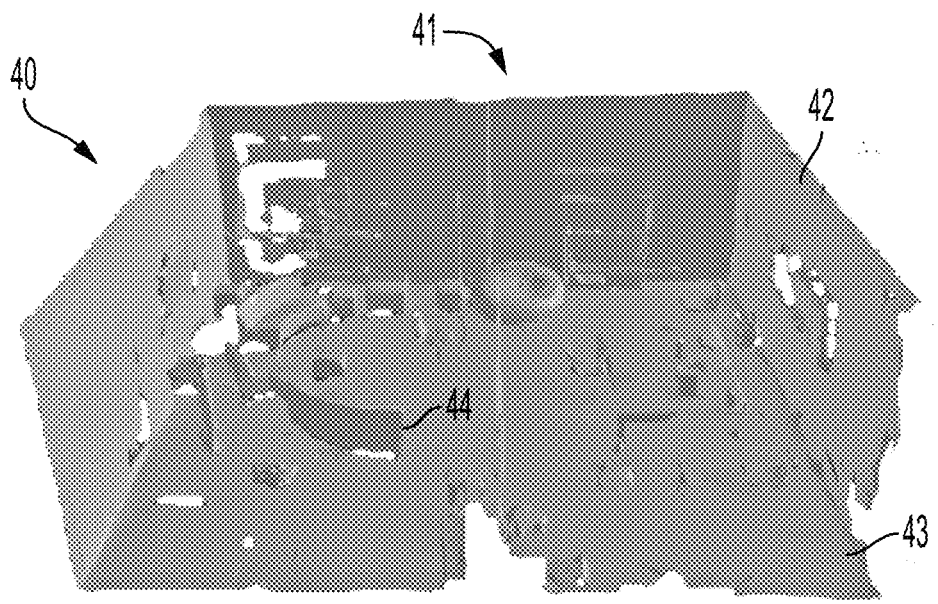
FIG. 3 is a block diagram showing, by way of example, a representation of a room using triangle mesh.
Figure 4:
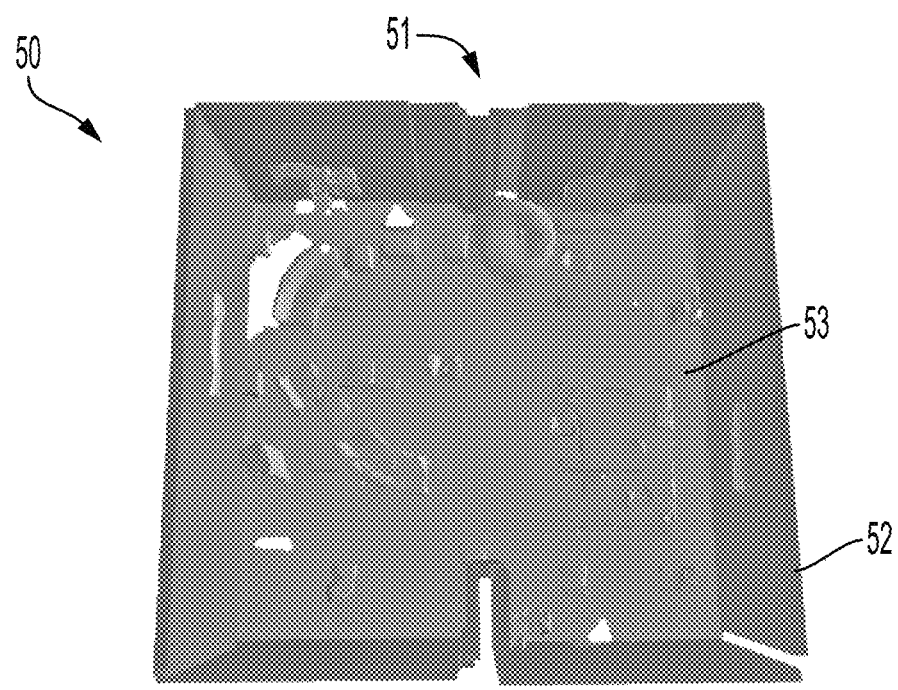
FIG. 4 is a block diagram showing, by way of example, a different representation of the room of FIG. 3.

A model or floorplan for the space is generated (step 32) using cameras, LiDAR, computer vision, geometric processing, or other techniques. In one embodiment, Microsoft HoloLens 2 can be utilized to build a triangle mesh that approximates walls, floors, ceilings, and objects, such as furniture, of an interior of the space. Subsequently, geometric processing can be performed to generate a three-dimensional model or floorplan from the triangle mesh. For example, FIG. 3 is a block diagram showing, by way of example, a representation 41 of a room using triangle mesh. The mesh representation shows three walls 42, a floor 43, and objects 44 placed within the room. FIG. 4 is a block diagram showing, by way of example, a different representation 51 of the room of FIG. 3. Flat wall detection has been run on the mesh data to detect the most likely locations of walls 53 in the room. Flat surfaces, representing walls, in one color are superimposed on top of the original mesh triangles of FIG. 3, which represent a floor 52 and can have the same color or a different color than the flat surface.

Figure 5:
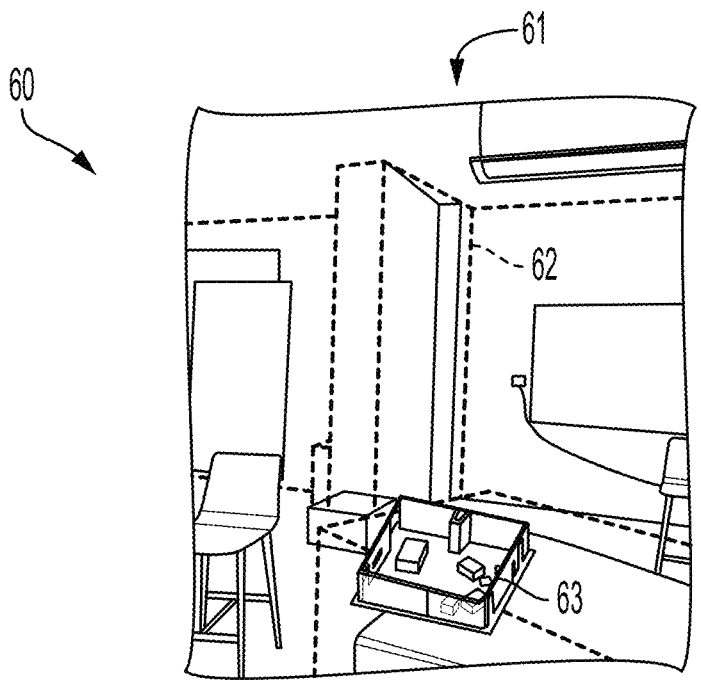
FIG. 5 is a block diagram showing, by way of example, an image of a room being scanned to detect distances of room surfaces.
Figure 6:
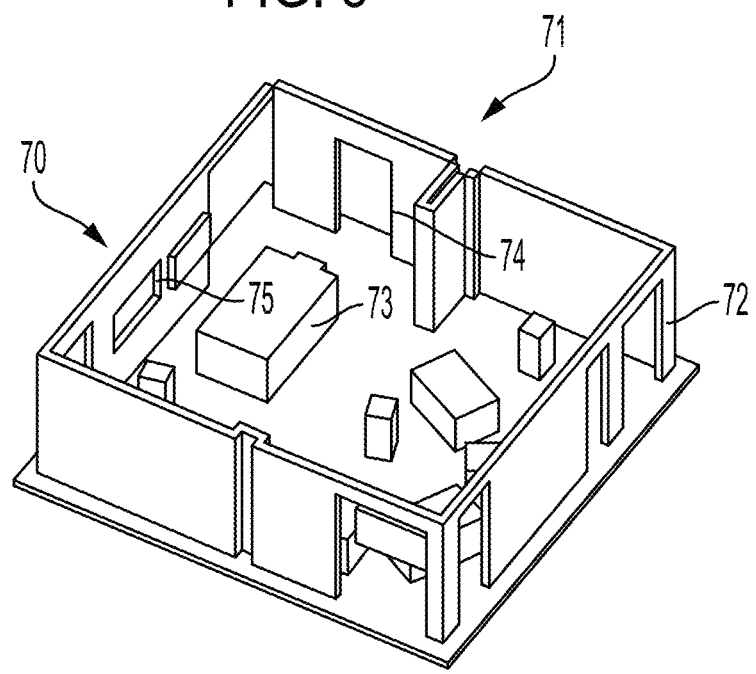
FIG. 6 is a block diagram showing, by way of example, the three-dimensional model of FIG. 5.

In another embodiment, an Apple iPad Pro or Apple iPhone 12 or newer can use Apple RoomPlan library to detect distances to room surfaces and package resulting data as a three-dimensional point cloud. Apple RoomPlan also detects walls, floors, ceilings, and common types of furniture form the point cloud and exports the data as a simple 3D model. The model can be sliced to produce a drafting-style floorplan of the space. FIG. 5 is a block diagram showing, by way of example, an image 61 of a room being scanned to detect distances of room surfaces. White lines 62 are superimposed on top of the room image to show where walls or pieces of furniture are discovered. The white lines can be used to generate a three-dimensional model 63. Further, FIG. 6 is a block diagram showing, by way of example, the three-dimensional model 71 of FIG. 5. The three-dimensional model 71 includes walls 72 and furniture 73, which can be represented as blocks that sit on the floor. Additionally, appropriate software can be used to approximate the positions of doors 74 and windows 75 within the space. Other types of models and floorplans are possible. However, at a minimum, the model or floorplan should be expressed as three-dimensional points in a Cartesian coordinate system.

Returning to the discussion with respect to FIG. 2, a scan of the space is performed to identify (step 33) all sensors located in the space. The scan can include moving a HoloLens or mobile device, such as a device with iOS, around the space. Computer vision is used to detect the sensors and calculations are performed to determine an identity and location of the sensors. The calculations can include position, orientation and color of a detected surface of the sensor or other object, as well as texture analysis of the detected surface. Objects can also be detected from contiguous surfaces, including convex and concave shapes, aggregates of contiguous shapes, and clustering of contiguous shapes pattern matching to known shapes. The calculations can also include the differencing of objects and scenes from repeated sampling over time and an estimation of object and surface transparency based on other sensor data, such as fiber-optic sensors and fibers, photoelectric proximity sensors, infrared sensors, and retro-reflective photoelectric sensors. The reconstruction of area environments can also be determined from an aggregation of detected objects in the space.

The model or floorplan is annotated (step 34) with representations of the sensors and used to show that sensor position, orientation, and QR data are known, such as when displayed (step 35). Once identified, data is captured (step 36) from the sensors. For example, when Bluetooth low energy (BLT) sensors are used, the data can be packaged into BLE advertisements. The BLE advertisements are used to transmit data from end-devices to a central device. A wireless hub then captures the advertisements, extracts the data, such as readings from the sensors, including temperature or humidity, and sends the data for processing.

In other examples, the data may not be sent as part of the advertisement buy can be requested from the sensor using the BLE GATT protocol. Specifically, the sensor advertises a set of services that can be performed, including a service that returns its recent data values. From the advertisement, the wireless hub determines what king of sensor sent that advertisement. An appropriate GATT service corresponding to that type of sensor is then identified and a call to that service is made to obtain the data value of the sensor.

Each piece of captured data from the sensors is delivered to a messages queues system. The captured data can be distributed to the queues based on sensor type, such as heat, humidity, activity, air quality, and other sensor types. The data can also be distributed based on values of the readings, such as readings that are above or below a predefined threshold, a change in values such as a rate of change or acceleration of change, data matching a predefined or inferred pattern such as shut down or start up, temporal patterns such as day, night, weekend, holiday or season, or distributed by user-defined tags assigned during the commissioning process, such as room number, in the presence of outside windows or near vents. The user-defined tags or annotations can be assigned to an object as described in detail in U.S. patent application Ser. No. 18/459,206, titled "System and Method for Capture of Physical Object Data for Environment Modeling," to Nelson, and filed on Aug. 31, 2023, which is hereby incorporated by reference in its entirety. Other types and conditions for distributing the messages to queues are possible.

Applications that use the data for processing, analysis, control such as for room environments, display, logging, and auditing can subscribe to receive sensor readings of that type. A MAC address for each sensor is sent along with each data value so that it is easy to determine which sensor produced that value. The data can also be used to generate (step 37) a dynamic heat map of the space. Heat maps are discussed further below with respect to FIGS. 10A and 10B.

Figure 7:
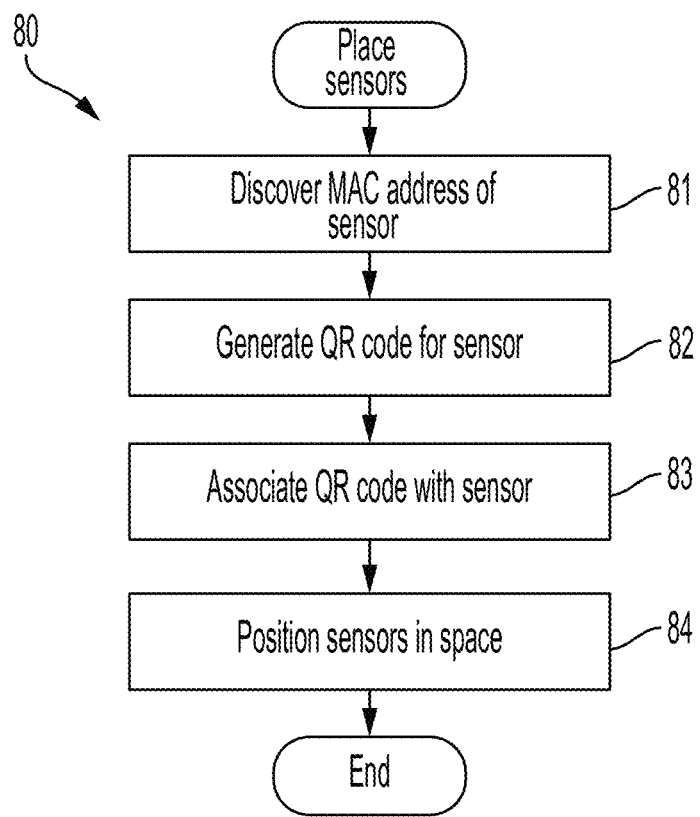
FIG. 7 is a flow diagram showing, by way of example, a process for placing sensors.

To identify the sensors, the sensors must be identifiable and placed in the space. During a scan of a space with sensors, a QR code recognition application can be used to detect the sensor via a QR code associated with the sensor to capture a three-dimensional position and orientation of each sensor in a coordinate system, such as a Cartesian coordinate system. FIG. 7 is a flow diagram showing, by way of example, a process for placing sensors for identification. A MAC address for each sensor to be placed in a space is determined (step 81). The MAC address is a network unique identifier, of a sensor. If the MAC address is not already known, the sensor must be powered on and communicate using Bluetooth wireless communication. In one example, some Bluetooth sensor include a pairing button that the user can press to pair that sensor with another device. When the button is pressed, the sensor sends its BLE advertisement signal at a faster rate than normal. Other devices in a predetermined vicinity of the sensor can listen for the advertisements, determine which device is advertising the most rapidly, and then, pick out the MAC address of that device advertising most rapidly from the Bluetooth communications.

However, if the sensor does not include a pairing button or if the button is inconvenient to press, Bluetooth signal strength can be used to determine the MAC address of a sensor. The user picks up a capture device that has a Bluetooth transceiver that is able to run software for rapid sensor commissioning, such as the Mircosoft HoloLens 2 or particular iOS devices, which are mentioned above. The capture device is moved close to the sensor of interest and waits for a predetermined amount of time, such as 30 seconds, to give all the Bluetooth devices in an area a chance to send their Bluetooth advertisements. The capture device receives all these advertisements and notes the signal strength of each. Advertisements are ignored if the advertisement reveals that it cannot possibly be a sensor. From the remaining advertisement, the MAC address of the strongest advertisement is assigned to the sensor of interest.

Figure 8:
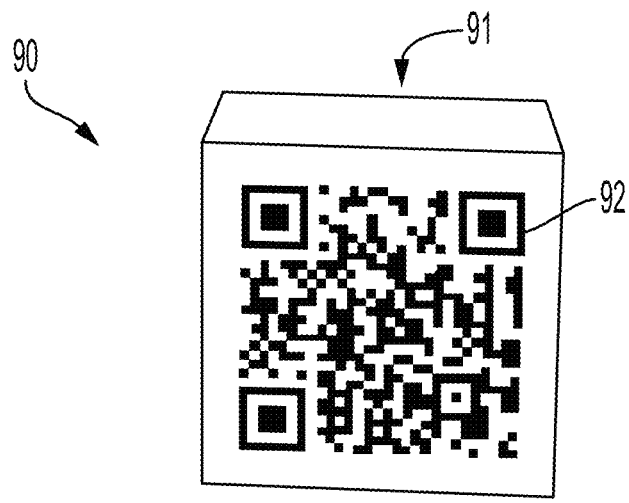
FIG. 8 is a front view of a sensor with a QR code attached.

Once the MAC address is determined for a sensor, a QR code is generated (step 82) for that sensor using an available QR code generation library to encode the MAC address in the QR code. The QR code can be exported as a printable file, such as an image file or PDF file. The size of the printed QR code can be modified so that it is similar in size to the sensor itself. The QR code can be attached (step 83) to the sensor via an adhesive, such as glue paste, or tape, or printed on the sensor. FIG. 8 is a front view 90 of a sensor 91 with a QR code 92 attached.

Figure 9:
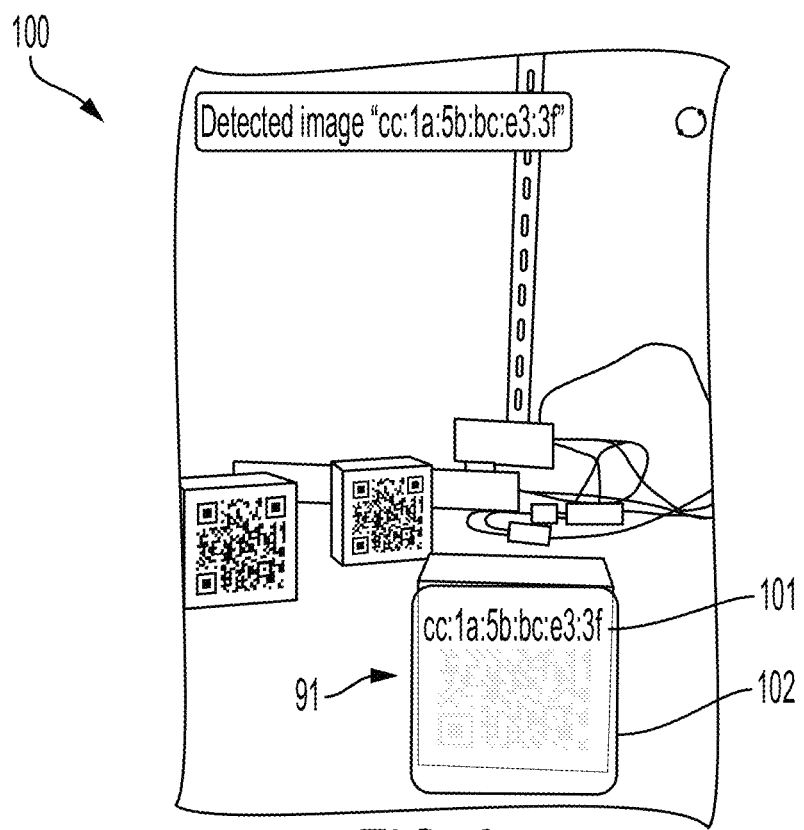
FIG. 9 is a front view of a representation of a sensor with decoded data.

Returning to the discussion with respect to FIG. 7, the sensors associated with QR codes can then be placed (step 84) within the space. A scan of the space can be run using a QR code recognition application on a mobile device, such as an iOS device or HoloLens, to find each QR code of the sensors placed in the space. Once found, each QR code is decoded on a white box is displayed at the position and orientation of the found QR code in the model or floorplan. The decoded data can be displayed on the white box. Other types of representations of the sensors can be used, such as a clear box, or other shapes and colors. FIG. 9 is a front view of a representation 102 of a sensor 100 with decoded data 101.

The three-dimensional position and orientation of each sensor can be determined in a Cartesian coordinate system using for example, a QR code recognition application. If the coordinate system of the sensors is the same as the coordinate system of the model or floorplan, the sensors are easily represented in the model or floorplan. However, if the coordinate systems are different, the position and orientation of the sensors in the coordinate system needs to be transformed to the coordinate system of the model or floorplan, which can be performed in a few different ways.

For example, the three-dimensional model building functions and the QR code functions can run in the same software application, directly sharing their knowledge of the room coordinate system or unique QR codes can be stuck to objects in the room, such as walls or tables, and then used as landmarks. The three-dimensional building application and the QR code application can look for the QR codes of the objects and then construct a consistent coordinate system relative to the positions of the QR codes of the objects. Additionally, both the AR code application and building application can look for distinctive objects in the environment. The building application can export a file that describes how its coordinate system was placed relative to the distinctive features. Also, the QR code application can then place its coordinate system in the same way relative to those distinctive features. Other methods for aligning the coordinate systems of the model or floorplan with the sensors are possible.

Figure 10A:
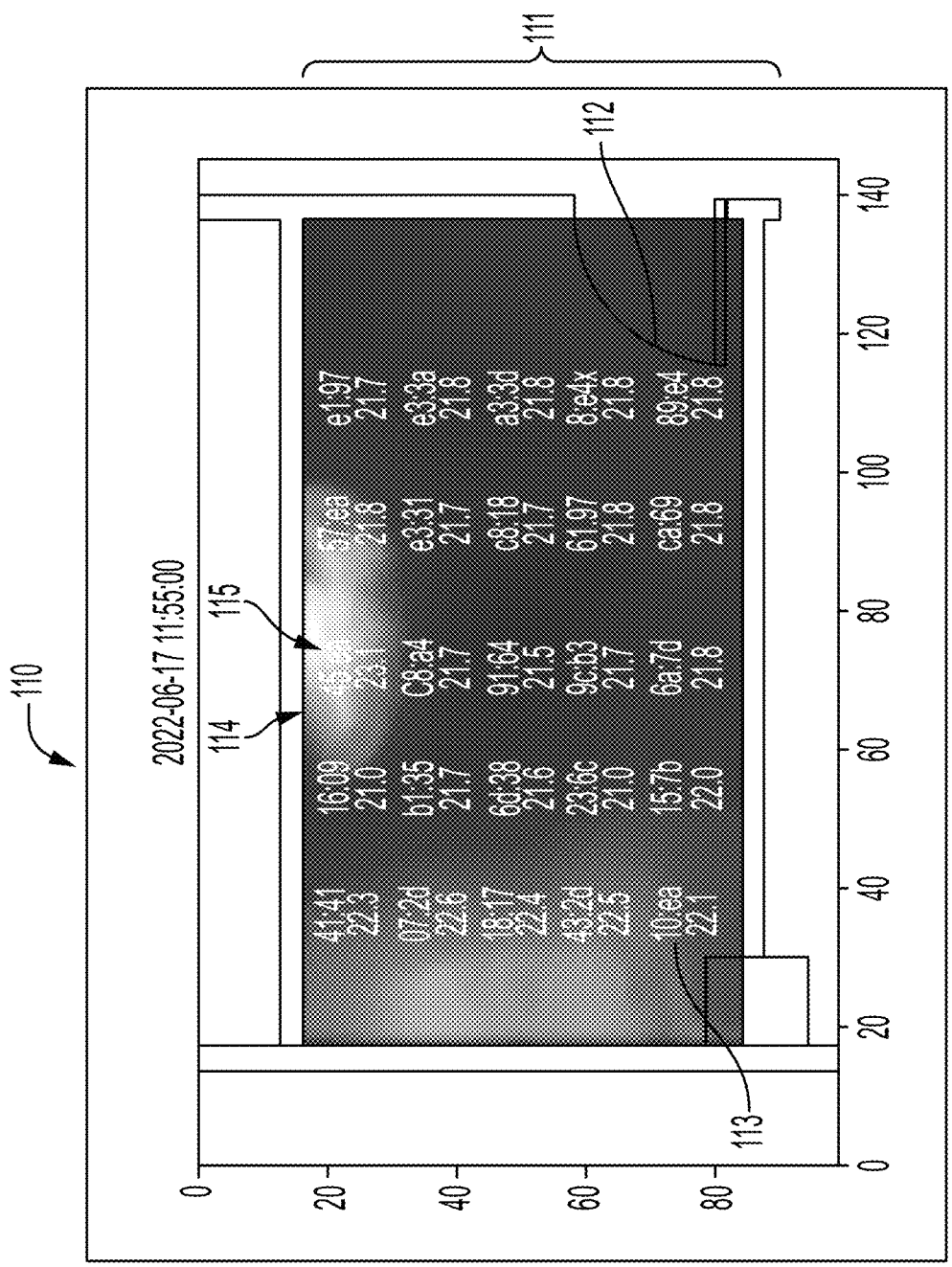
FIG. 10A is a block diagram showing, by way of example, a temperature heat map 110 for a space in the morning.

Once the model or floorplan has been annotated with the sensors, data collected from the sensors can be aggregated to produce a dynamic heat map of an interior of the space. FIG. 10A is a block diagram showing, by way of example, a temperature heat map 110 for a space in the morning. The heat map includes data collected from the space at a particular time, which can be listed on the map. The data used for the heat map was collected from temperature sensors placed in a space, such as a room 111, in a 5×5 grid. The heat map 110 is provided over a configuration of the room with a door 112 represented in the lower right corner of the room 111. Readings 113 from the sensors in the space 111 are placed in corresponding locations of the sensors. Different colors can represent different temperatures in the space. For example, red can represent really high temperatures, white can represent moderate temperatures, and blue can represent colder temperature. For each color, the darker the color on the heat map, the more intense the temperature recorded by that sensor. With respect to the heat map 110, a white patch 114 is displayed over and around a sensor with the highest temperature reading of 23.1 C to show that the middle top side of the room is the warmest.

Figure 10B:
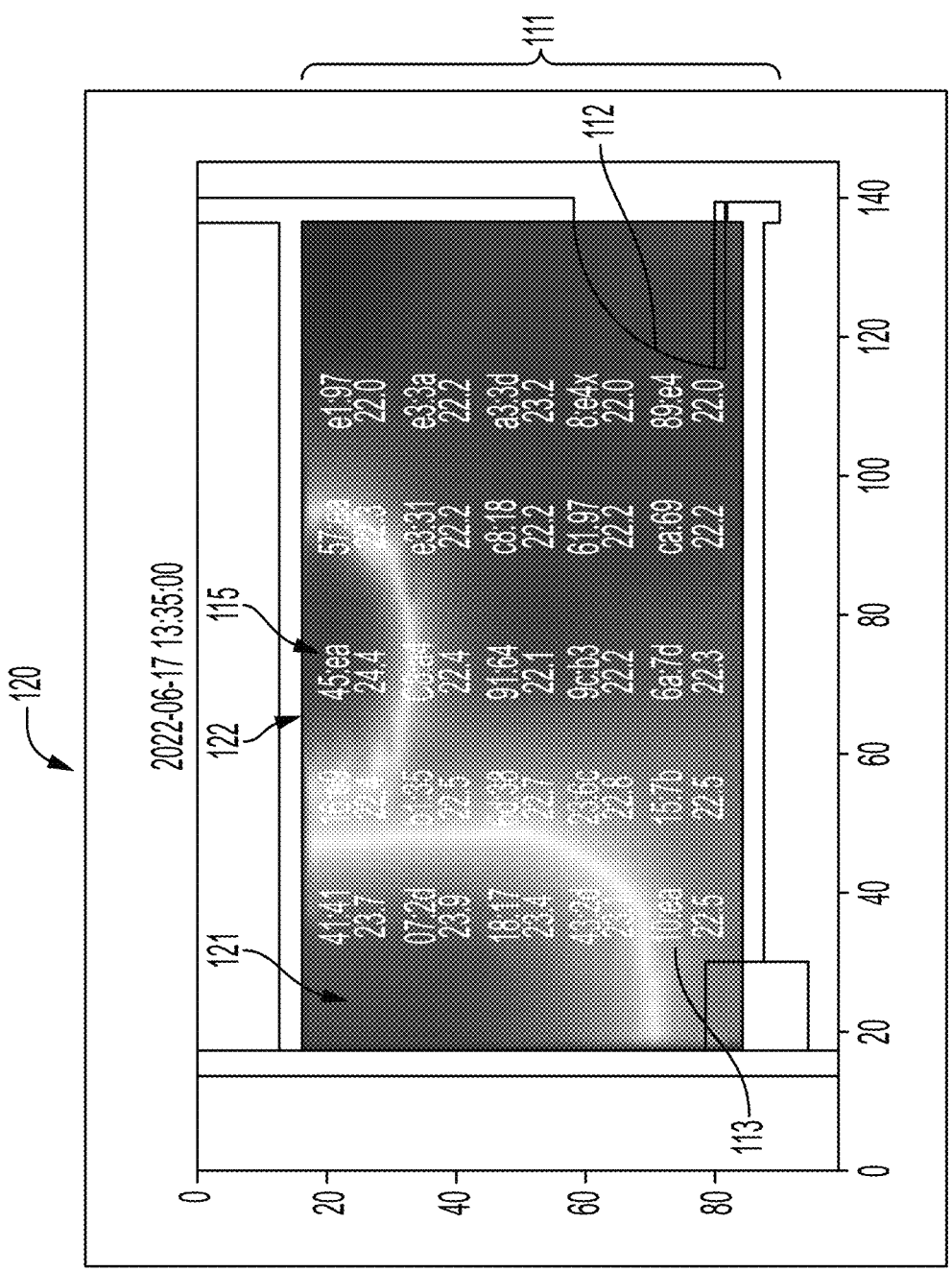
FIG. 10B is a block diagram showing, by way of example, a temperature heat map 120 for a space in the afternoon.

Data can be continuously collected from the sensors in the space and another heat map can be generated using readings from the sensors at a specific time or as average readings over a time period. FIG. 10B is a block diagram showing, by way of example, a temperature heat map 120 for a space 111 in the afternoon. The space 111 includes a door 112 in a lower right corner and has sensors placed in a 5×5 grid. The heat map 120 is displayed over a representation, such as an image of the space 111 and includes readings 113 from each of the sensors at a given time or over a predetermined period of time. Colors are displayed in the heat map based on a temperature reading for each sensor.

In one example, lower temperatures, such as those below a certain threshold, can be assigned the color blue. Also, the lower the temperature, the darker the blue color displayed. Higher temperatures, such as those above a threshold, can be associated with another color, such as red. The higher the temperature, the darker the red color can be displayed. Also, a different color can be used to represent moderate temperatures, which can be determined as the temperatures between the lower threshold for lower temperatures and the higher threshold for hot temperatures. The moderate temperatures can be displayed via a different color, such as white. Temperatures near the moderate temperature range can also appear close to white even though categorized as high or low since they are so close to the moderate temperatures.

The colors in the heat map 120 show some level of blue in most of the map, especially in the lower right corner and middle. Most of the left side and upper middle of the room show levels of red, which indicate warmer temperatures than the lower right corner and middle that show blue. When the heat map from FIG. 10A, which was based on readings obtained in the morning, is compared with the heat map in FIG. 10B, which was based on readings obtained in the afternoon, the space appeared to warm up in the afternoon. Although the heat maps show the sensors in a regular grid pattern, any pattern or random placement of the sensors can be used.

As described above, sensor commissioning includes a number of steps that includes the placement of sensors, generating and annotating a model with sensor data, and collecting data from the sensors. The amount of time needed to commission sensors can be dependent on whether the commissioning is a one-time commission, a recommission, or sensors movement detection. For a one-time commissioning, sensors are removed from the box and batteries are inserted. The pairing button is pressed to discover the MAC address and generate the QR code. The QR code is printed and attached to the sensor, and the sensor is then positioned in a room for detection. A user can walk around the room until a high quality model is produced. Based on these steps, each sensor can take 5 to 10 minutes to commission. For every 25 sensors placed, a wireless hub should also be placed. Accordingly, to commission 100 sensors in 10 rooms, the time needed is around 9.5 hours, which can be achieved in a single day and much faster than current methods.

For recommissioning, such as temporary installation of sensors in one space and later moving one or more sensors based on data received, commissioning can be quicker than a first or initial commissioning since the AR codes are already generated. If sensor commissioning is deployed to determine whether any sensors have moved, there is no need to re-scan the room or generate a new model unless walls or important furniture has moved. To detect sensor movement, the QR code detection is run and is faster than manually walking though a space to identify new placement of sensors, some of which may be missed.

Sensor commissioning can be useful across many applications, including building commissioning, energy management, predictive maintenance, factory design, personal comfort, datacenter energy reduction, rapid comfort, inventory management, dehumidifier upgrade, and rapid energy model construction. For building commissioning, measurable dynamic system performance requirements that can be definitively measured through field testing methodologies can be established, while for energy management, the sensors can be used to support building construction and building upgrades that use added sensors to reduce energy consumption, energy cost or grid responsiveness, such as in office buildings, schools, homes, or stores. With respect to predictive maintenance, models and systems can be created for predictive maintenance in factories and commercial building HVAC systems. Models can be created of a factory building before, during, and after the factory is constructed for factory design, while buildings can be retrofitted with personal comfort devices and sensors to match for personal comfort determination. For example, a person can add personal heaters in each office together with temperature sensors near each occupant of a space. Additionally, IR sensors can be commissioned to capture skin temperature of the occupants and area temperatures of walls, floors, and desks to make HVAC systems keep offices comfortable.

For datacenter energy reduction, energy consumption can be reduced in datacenters using dense sensors to model heat flow from racks of computers and to measure that heat flow during operation. Meanwhile, for inventory management, computer vision and QR code recognition can provide flexible inventory management in warehouses. For example, boxes and other packages or objects can be tracked as they move in three-dimensional space to provide the three-dimensional positions of the boxes, packages, and objects. To determine whether a dehumidifier needs to be updated, a dense array of humidity sensors can be added to a space and the sensors can be used to model current humidity dynamics and also measure improvement of humidity by the addition of dehumidifiers. Model commissioning can also be used for rapid energy model construction by building models of building interiors to guide and improve the commissioning process and create new opportunities for controlling and maintaining buildings.

While the invention has been particularly shown and described as referenced to the embodiments thereof, those skilled in the art will understand that the foregoing and other changes in form and detail may be made therein without departing from the spirit and scope of the invention.

What is claimed is:

1. A system for rapid sensor commissioning, comprising:
a three dimensional model of a space;
a mobile computing device to perform the following:
scan the space for identifiers associated with wireless sensors placed within the space;
identify at least one of the identifiers associated with the wireless sensors;
a server comprising a central processing unit, memory, an input port configured to receive the three dimensional model and data regarding the identifiers from the mobile computing device, and an output port, wherein the central processing unit is configured to:
annotate the model with a representation of the sensor identified by the identifier;
collect data from the wireless sensor; and
assign the collected data to at least one message queue based on a type of the sensor, based on values of the data, a change in the values of the data, and a recognized pattern of the collected data.

2. A system according to claim 1, wherein the three-dimensional model of the space is performed by determining positions and orientations of one or more of walls, floors, ceilings, and furniture in the space.

3. A system according to claim 1, wherein the central processing unit performs the following:
determine a type of coordinate system for the model;
determine a type of coordinate system for the sensors; and translate a location of the sensors in the sensor coordinate system to the model coordinate system when the types of coordinate systems of the model and the sensors are different.

4. A system accordingly to claim 1, wherein the identifiers of the sensors each comprise a QR code.

5. A system according to claim 4, wherein the QR codes are affixed to the sensors.

6. A system according to claim 4, wherein the QR codes each encode a unique network identifier of the sensor associated with that QR code.

7. A system according to claim 1, wherein the central processing unit accesses the unique network identifier of each sensor via wireless communications of the sensor with a mobile device.

8. A system according to claim 1, wherein the annotated model comprises positions and orientations of walls, floors, ceilings, furniture, and the sensors.

9. A system according to claim 1, wherein the sensor data is collected via a wireless hub.

10. A system according to claim 1, wherein the central processing unit generates at least one heat map using the data collected from the wireless sensors in at least one of the message queues.

11. A method for rapid sensor commissioning, comprising:
generating a three dimensional model of a space;
scanning the space for identifiers associated with wireless sensors placed within the space;
identifying at least one of the identifiers associated with the wireless sensors;
annotating the model with a representation of the sensor identified by the identifier;
collecting data from the wireless sensor; and
assigning the collected data to at least one message queue based on a type of the sensor, based on values of the data, a change in the values of the data, and a recognized pattern of the collected data.

12. A method according to claim 11, wherein the three-dimensional model of the space is performed by determining positions and orientations of one or more of walls, floors, ceilings, and furniture in the space.

13. A method according to claim 11, further comprising:
determining a type of coordinate system for the model;
determining a type of coordinate system for the sensors; and
translating a location of the sensors in the sensor coordinate system to the model coordinate system when the types of coordinate systems of the model and the sensors are different.

14. A method accordingly to claim 11, wherein the identifiers of the sensors each comprise a QR code.

15. A method according to claim 14, wherein the QR codes are affixed to the sensors.

16. A method according to claim 14, wherein the QR codes each encode a unique network identifier of the sensor associated with that QR code.

17. A method according to claim 11, further comprising:
accessing the unique network identifier of each sensor via wireless communications of the sensor with a mobile device.

18. A method according to claim 11, wherein the annotated model comprises positions and orientations of walls, floors, ceilings, furniture, and the sensors.

19. A method according to claim 11, wherein the sensor data is collected via a wireless hub.

20. A method according to claim 11, further comprising:
generating at least one heat map using the data collected from the wireless sensors in at least one of the message queues.

* * * * *